(12) United States Patent
Ronan (10) Patent No.: US 10,072,586 B2
(45) Date of Patent: Sep. 11, 2018

(54) ENVIRONMENTAL CONTROL GENERATOR SYSTEM AND APPARATUS

(71) Applicant: HAMILTON SUNDSTRAND CORPORATION, Charlotte, NC (US)

(72) Inventor: Michael Ronan, East Hartford, CT (US)

(73) Assignee: HAMILTON SUNDSTRAND CORPORATION, Charlotte, NC (US)

(*) Notice: Subject to any disclaimer, the term of this patent is extended or adjusted under 35 U.S.C. 154(b) by 392 days.

(21) Appl. No.: 14/884,482

(22) Filed: Oct. 15, 2015

(65) Prior Publication Data

US 2016/0032841 A1     Feb. 4, 2016

Related U.S. Application Data

(63) Continuation of application No. PCT/US2014/042983, filed on Jun. 18, 2014.

(Continued)

(51) Int. Cl.
| | |
|---|---|
| *F04D 29/00* | (2006.01) |
| *F02C 9/18* | (2006.01) |
| *B64D 13/06* | (2006.01) |
| *F01D 15/10* | (2006.01) |
| *F02C 6/08* | (2006.01) |

(Continued)

(52) U.S. Cl.
CPC ............ *F02C 9/18* (2013.01); *B64D 13/06* (2013.01); *F01D 15/10* (2013.01); *F02C 3/04* (2013.01); *F02C 6/08* (2013.01); *F02C 7/12* (2013.01); *F02C 7/32* (2013.01); *B64D 2013/0644* (2013.01); *F05D 2220/62* (2013.01); *F05D 2220/76* (2013.01); *Y02T 50/56* (2013.01); *Y02T 50/672* (2013.01)

(58) Field of Classification Search
None
See application file for complete search history.

(56) References Cited

U.S. PATENT DOCUMENTS 5,137,230 A  *  8/1992  Coffinberry ............. B64C 21/06
                                          244/118.5
5,161,364 A  *  11/1992 Bruun .................... B64D 13/04
                                          60/772

(Continued)

FOREIGN PATENT DOCUMENTS

| EP | 0888966 | 1/1999 | |
|---|---|---|---|
| GB | 2417524 | 3/2006 | |
| GB | 2417524 A  * | 3/2006 | ............... F02C 6/08 |

OTHER PUBLICATIONS

International Search Report and Written Opinion dated Oct. 29, 2014 in Application No. PCT/US2014/042983.

(Continued)

*Primary Examiner* — Igor Kershteyn
*Assistant Examiner* — Jason Fountain
(74) *Attorney, Agent, or Firm* — Snell & Wilmer L.L.P.

(57) ABSTRACT

An environmental control power generation system is provided. The system may include a turbine and a generator. The system may be configured to provide air form a high pressure bleed port and/or a low pressure bleed port to the turbine. The turbine may be configured to reduce the pressure of the supplied air and generate power through the generator. The power may be supplied to an aircraft power distribution system.

15 Claims, 5 Drawing Sheets

Related U.S. Application Data (60) Provisional application No. 61/868,438, filed on Aug. 21, 2013.

(51) Int. Cl.
    *F02C 7/32* (2006.01)
    *F02C 3/04* (2006.01)
    *F02C 7/12* (2006.01)

(56) References Cited

U.S. PATENT DOCUMENTS

| | | | |
|---|---|---|---|
| 6,189,324 B1 * | 2/2001 | Williams | B64D 13/06 62/172 |
| 2008/0150356 A1 | 6/2008 | Breit et al. | |
| 2009/0282822 A1 | 11/2009 | McBride et al. | |
| 2012/0013177 A1 | 1/2012 | Krenz et al. | |
| 2012/0192578 A1 | 8/2012 | Finney | |
| 2013/0139515 A1 * | 6/2013 | Schlak | F02C 3/00 60/772 |

OTHER PUBLICATIONS

International Preliminary Report on Patentability dated Feb. 23, 2016 in Application No. PCT/US2014/042983.
Extended European Search Report dated Jul. 12, 2016 in European Application No. 14838031.4.

\* cited by examiner (PRIOR ART)

FIG.5

ENVIRONMENTAL CONTROL GENERATOR SYSTEM AND APPARATUS

CROSS-REFERENCE TO RELATED APPLICATIONS

This application is a continuation of, claims priority to and the benefit of, PCT/US2014/042983 filed on Jun. 18, 2014 and entitled "ENVIRONMENTAL CONTROL GENERATOR SYSTEM AND APPARATUS," which claims priority from U.S. Provisional Application No. 61/868,438 filed on Aug. 21, 2013 and entitled "ENVIRONMENTAL CONTROL GENERATOR SYSTEM AND APPARATUS." Both of the aforementioned applications are incorporated herein by reference in their entirety.

FIELD OF INVENTION

The present disclosure relates to aircraft environmental control system ("ECS"), and more specifically, to flow regulation and power generation in ECSs.

BACKGROUND OF THE INVENTION

A typical ECS may comprise flow and/or pressure regulating valves that reduce airflow and/or pressure of air bled off the high stage and low stage of the gas turbine engine. This air is conditioned (e.g., cooled and filtered) and then conducted to the cabin.

SUMMARY OF THE INVENTION

In various embodiments, a turbine assembly may comprise a turbine, a generator and a power distribution system. The turbine may be configured for installation in an environmental control system duct and in fluid communication with at least one of a high pressure bleed and a low pressure bleed of a gas turbine engine. The generator may be coupled to the turbine. The generator may be configured to produce power in response to rotation of the turbine. The power distribution system may be in electronic communication with the generator and an aircraft electrical distribution system.

In various embodiments, an environmental control system may comprise a turbine, a generator, a low pressure bleed port, and a high pressure bleed port. The generator may be coupled to the turbine. The low pressure bleed port may be configured to provide low pressure bleed air to the turbine. The high pressure bleed port may be configured to provide high pressure bleed air to the turbine.

In various embodiments, an aircraft power distribution system may comprise a primary aircraft power distribution system, and a secondary power distribution system. The primary aircraft power distribution system may comprise a primary generator. The secondary aircraft power distribution system may comprise a turbine and a secondary generator. The turbine may be configured to receive airflow from an environmental control system. The secondary generator may be coupled to the turbine. The secondary generator may be configured to produce power that is supplied to the primary aircraft power distribution system through the second aircraft power distribution system.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical, chemical and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, phrases such as "make contact with," "coupled to," "touch," "interface with" and "engage" may be used interchangeably. Different cross-hatching may be used throughout the figures to denote different parts but not necessarily to denote the same or different materials.

Figure 1:
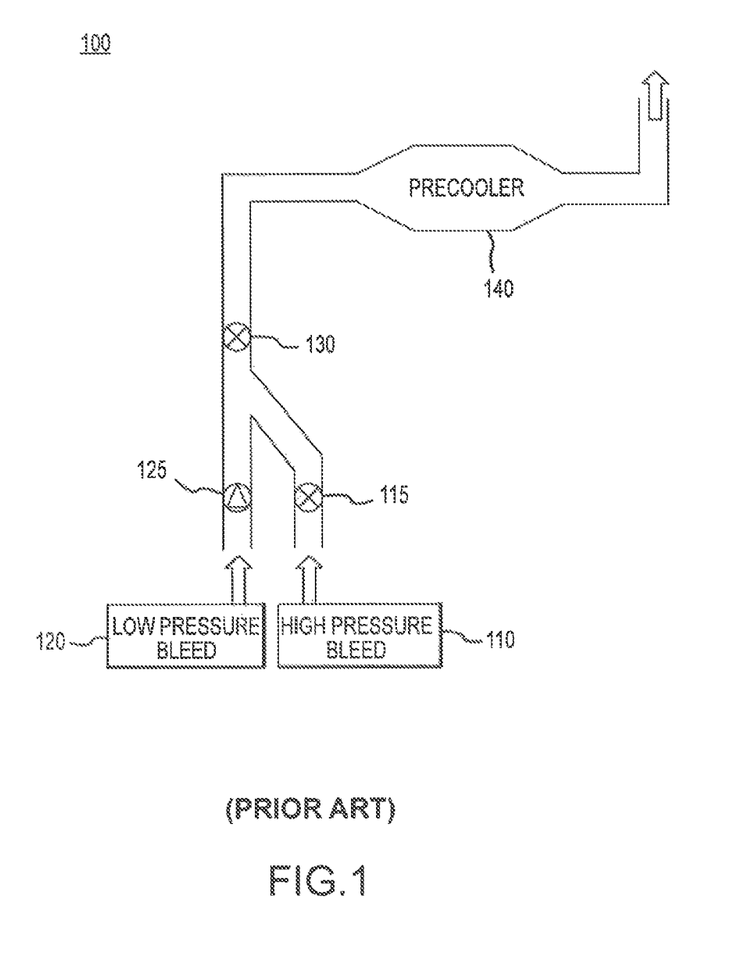
FIG. 1 is a schematic view of a prior art ECS system.

With reference to FIG. 1, a portion of a typical ECS 100 may be installed in an aircraft nacelle. For example, ECS 100 may be installed between in the engine and the outer nacelle housing (e.g., in the engine build-up zone). ECS 100 may comprise a high pressure bleed valve 115 (e.g., a pressure regulating valve), a low pressure bleed valve 125 (e.g., a pressure regulating valve and/or a check valve), a valve 130 (e.g., a flow control valve, pressure regulator valve, a shut-off valve, and/or any other suitable type of valve), and a precooler 140. High pressure bleed valve 115 (e.g., a pressure regulating valve) may be configured to and/or coupled to a high pressure bleed port 110. High pressure bleed air may be supplied through high pressure bleed port 110 from the high pressure portion of an aircraft gas turbine engine. Similarly, the low pressure bleed valve 125 (e.g., a check valve) may be configured to and/or coupled to a low pressure bleed port 120. Low pressure bleed air may be supplied through low pressure bleed port 120 from the low pressure portion of an aircraft gas turbine engine. In operation, the high pressure bleed port 110 and the low pressure bleed port 120 may supply air to valve 130. High pressure bleed air may be initially supplied to high pressure bleed valve 115. High pressure bleed valve 115 may initially regulate pressure from high pressure bleed port 110. Valve 130 may regulate the air flow and/or pressure into the precooler 140. Precooler 140 is configured to cool the air supplied from the high pressure bleed port 110 and the low pressure bleed port 120.

Figure 2:
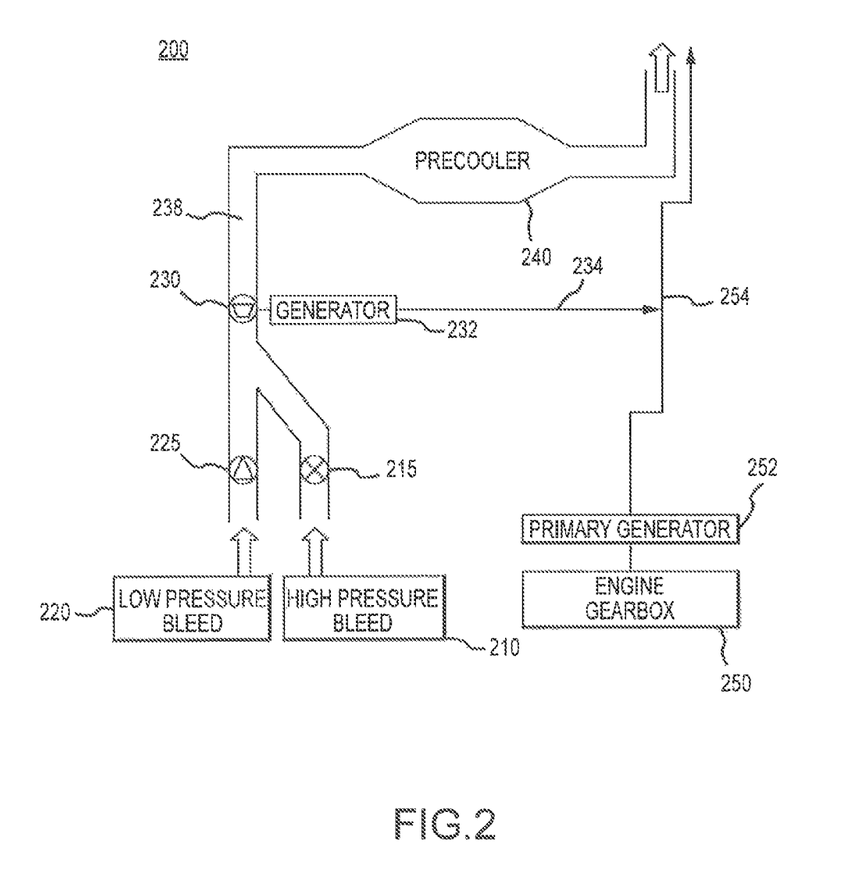
FIG. 2 is a schematic view of an ECS system comprising a turbine generator in accordance with various embodiments.

In various embodiments and with reference to FIG. 2, ECS 200 may comprise a high pressure bleed valve 215, a low pressure bleed valve 225, turbine 230, and a precooler 240. Turbine 230 may be coupled to and/or configured to drive a generator 232. Turbine 230 and/or generator 232 may further be coupled to and/or be in electronic communication with, an aircraft power distribution system 254 (e.g., aircraft wiring or power management components such as a power bus) in the aircraft. More specifically, generator 232 may be configured to generate electricity that is conducted to a power supply system of the aircraft.

In various embodiments, turbine 230 may be installed at any suitable point in ECS 200. In this regard, turbine 230 may be installed in an ECS duct and be configured to receive at pressurized fluid flow (e.g., a pressurized airflow) from at least one of high pressure bleed 210 and/or low pressure bleed 220.

In various embodiments, an aircraft power system may comprise a primary generator 252. Primary generator 252 may be coupled to or be driven by an engine gearbox 250. Engine gearbox 250 may be installed on and/or may be a portion of a gas turbine engine (e.g., an auxiliary power unit ("APU") or main engine) of the aircraft. Primary generator 252 may be coupled to and/or may be configured to supply electricity to aircraft power distribution system 254 (e.g., the wiring of the aircraft).

In various embodiments, turbine 230 may be any suitable turbine. For example, turbine 230 may be a pressure regulating turbine. Turbine 230 may be configured as an axial turbine and/or a centrifugal turbine. Turbine 230 may be installed in a duct that is configured to conduct air from high pressure bleed port 210 and/or low pressure bleed port 220. This air may be conducted to and cause turbine 230 to rotate and/or spin. Turbine 230 may comprise a shaft that couples to a turbine wheel of turbine 230, which in turn is mechanically coupled to generator 232. Spinning of turbine 230 may cause the generator 232 to generate electricity derived from the mechanical movement of turbine 230. The electricity generated by generator 232 may be conducted over a secondary power distribution system 234. Secondary power distribution system 234 may connect to and/or be in electronic communication with generator 232 and/or aircraft power distribution system 254.

Pressurized air may be supplied to the ECS system via high pressure bleed port 210 and/or low pressure bleed port 220 based on engine operating parameters. During certain portions of a flight (e.g., take-off, climb and portion of cruise), the engine may produce sufficient pressure at low pressure bleed port 220 to supply the ECS system. During other portion of a flight (e.g., portions of cruise and descent), the pressure available at low pressure bleed port 220 may not be sufficient to supply the ECS system. As such, the pressure from high pressure bleed port 210 may be used to supplement and/or supply the ECS system with sufficient pressure.

In various embodiments, turbine 230 may be configured to replace the pressure regulating valve in a typical ECS system (e.g., ECS 100 as shown in FIG. 1). More specifically, turbine 230 may be configured to manage and/or regulate the pressure of the air from of high pressure bleed port 210 and/or low pressure bleed port 220. In this regard, the pressure of the air supplied to precooler 240 from turbine 230 may be sufficiently reduced for cooling and/or handling in precooler 240, based on the pressure drop across turbine 230. Moreover, the pressure drop of the air across turbine 230 may cause a temperature reduction, increasing the cooling efficiency of precooler 240. Alternatively, the expansion of air and associated reduction of temperature may allow for a relatively smaller precooler 240 as compared to a typical precooler in a typical ECS system (e.g., precooler 140 of ECS 100, as shown in FIG. 1).

In various embodiments, turbine 230 may be configured to or designed with a relatively high flow capacity. In this regard, turbine 230 is configured to receive air from high pressure bleed port 210 and/or low pressure bleed port 220. Turbine 230 may also be configured with or designed for a wide range of operating conditions (e.g., not a point design).

In various embodiments, turbine 230 may be designed as a lightweight turbine. For example, certain turbine components may be made of a lightweight material such as aluminum, titanium, and/or a composite.

Figure 3:
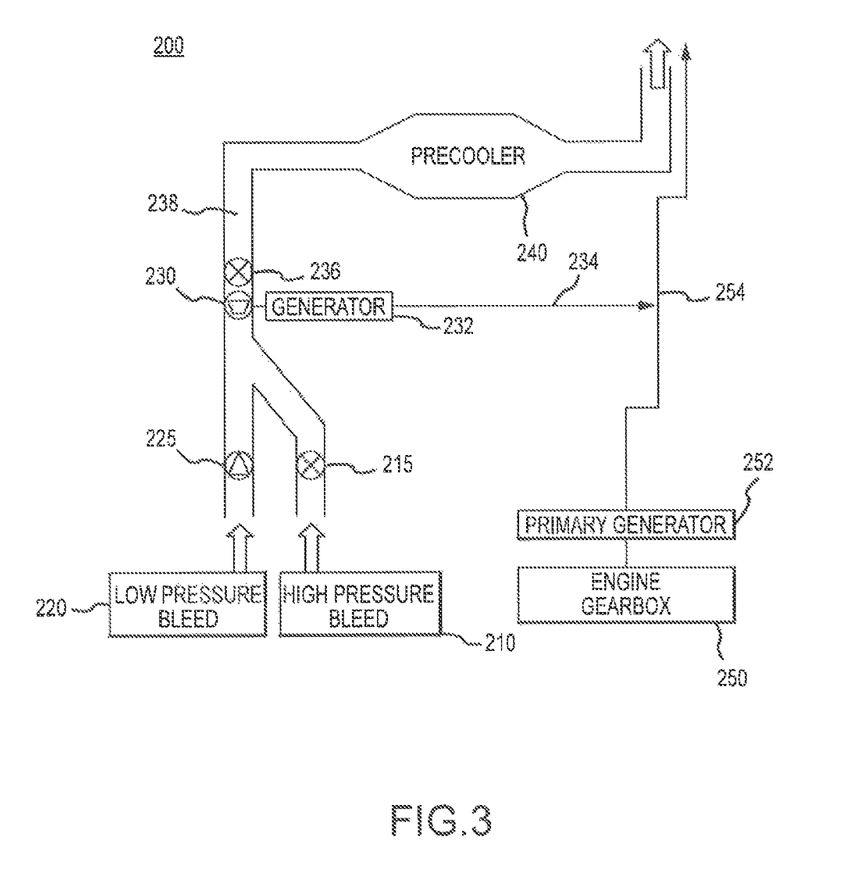
FIG. 3 is a schematic view of an ECS system comprising a turbine generator with a variable area exhaust in accordance with various embodiments.

In various embodiments and with reference to FIG. 3, turbine 230 may optionally comprise or be coupled to a valve 236. Valve 236 may be any suitable electric motor, hydraulic, pressure regulating, and/or flow control valve. Valve 236 may be configured to isolate the high pressure bleed port 210 and low pressure bleed port 220 from portions of ECS 200 and/or the aircraft (e.g., precooler 240, filters, cabin ducting, and/or the like). More specifically, in the event of a failure of high pressure regulating valve 215, valve 236 may be configured to close such that high pressure bleed air supplied from high pressure bleed port 210 to isolate portions of ECS 200 from high pressure bleed port 210 and/or low pressure bleed port 220.

In various embodiments, turbine 230 may be adjustable and/or may comprise a variable output geometry. In this regard, turbine 230 may be configured to regulate downstream pressure and/or flow that is supplied to precooler 240. Moreover, ECS 200 may be configured with a sensor 238. Sensor 238 may be configured to measure a pressure and/or flow rate downstream of turbine 230. ECS 200 and/or turbine 230 may be capable of receiving the measurement form sensor 238. Based on the measurement, ECS 200 and/or turbine 230 may be adjusted to supply a suitable amount of pressure and/or airflow to precooler 240. To regulate the pressure and/or airflow, turbine 230 may be configured with an adjustable exhaust nozzle and/or a variable area exhaust nozzle. This variable area exhaust nozzle may be provided by valve 236. For example, valve 236 may be a pressure regulating valve or flow control valve that is configured to adjust the exit nozzle area of turbine 230. Valve 236 may be a pressure regulating or flow control valve that is configured to receive a measured pressure and/or flow from sensor 238. In this regard, valve 236 may be configured to adjust and/or manage the air input to precooler 240.

Figure 4:
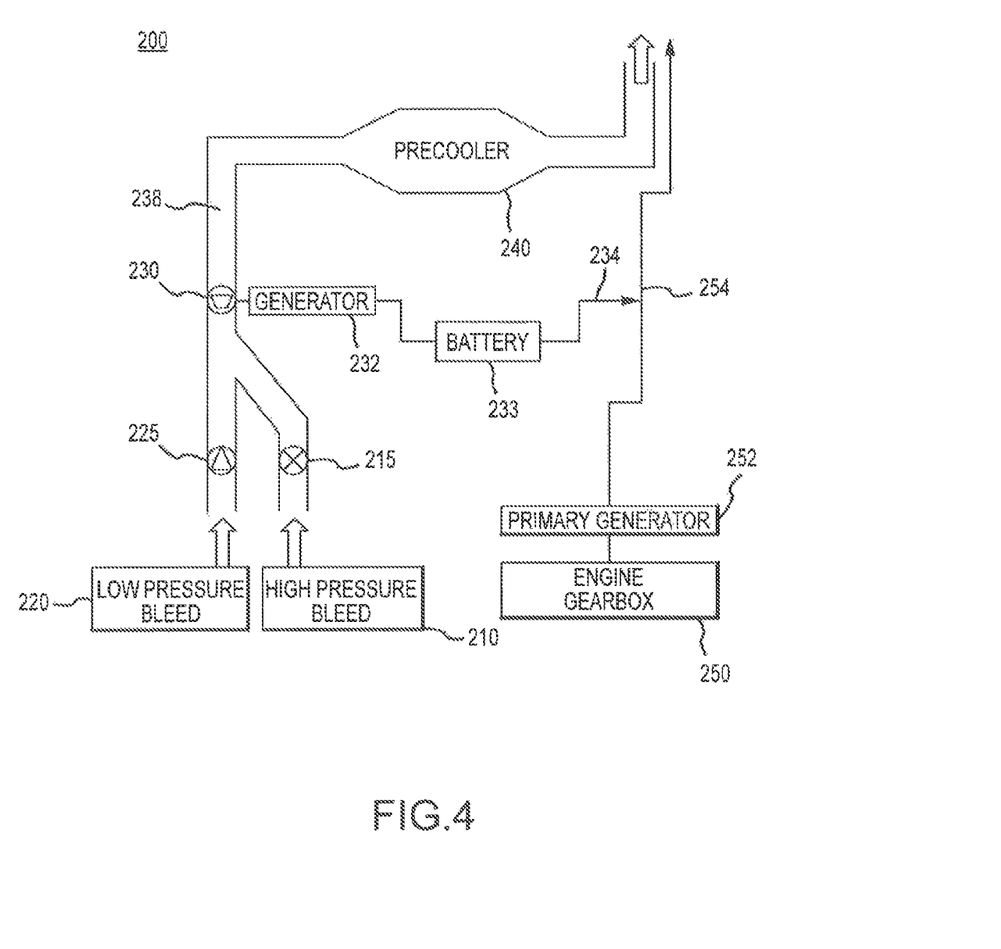
FIG. 4 is a schematic view of an ECS system comprising a turbine generator and battery in accordance with various embodiments.

In various embodiments and with reference to FIG. 4, ECS system 200 may comprise a battery 233. Battery 230 may be coupled to and/or electrically connected to generator 232. In this regard, batter 230 may be configured to store energy from generator 232 that may be used in various aircraft system when pressure from high pressure bleed 210 and/or low pressure bleed 220 are relatively low (e.g., during portions of cruise, and/or during descent).

Figure 5:
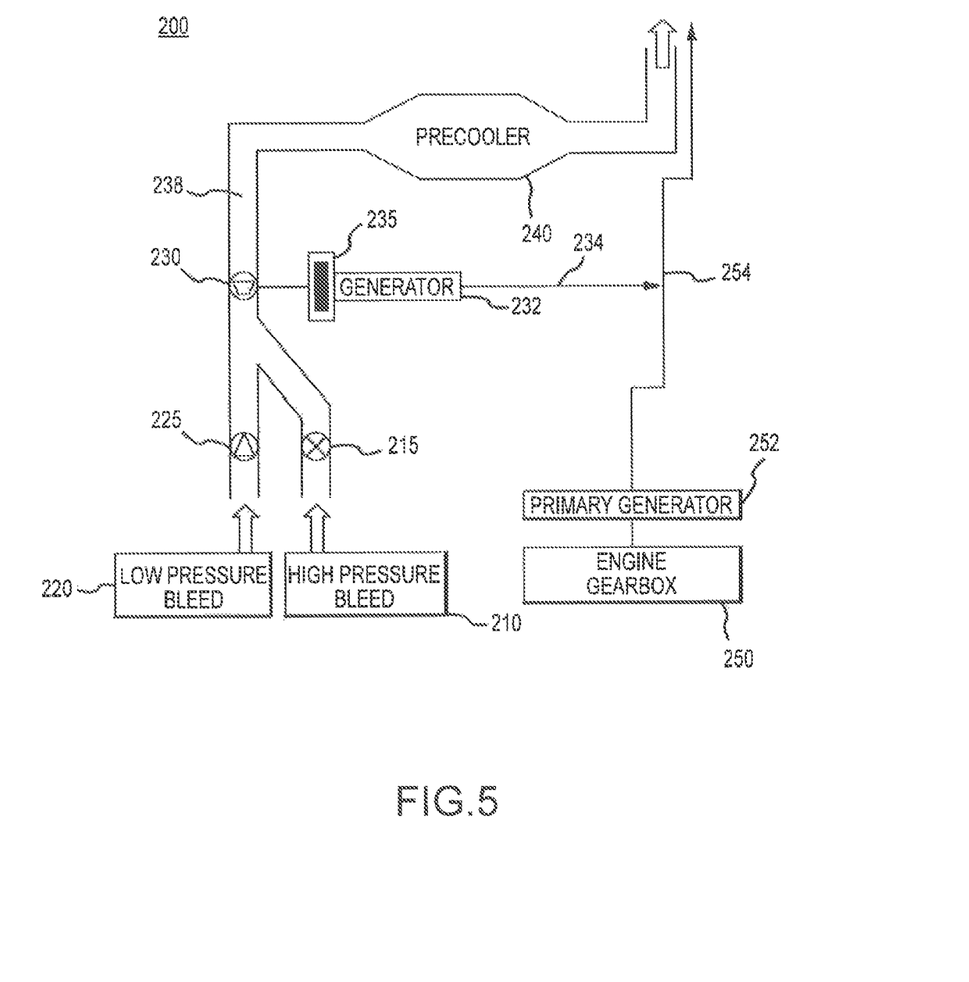
FIG. 5 is a schematic view of an ECS system comprising a turbine generator and a flywheel in accordance with various embodiments.

In various embodiments and with reference to FIG. 5, ECS system 200 may comprise a flywheel 235. Flywheel 235 may be operatively and/or rotatably coupled to turbine 230 and/or generator 232. Turbine 230 may be configured to drive and/or spin flywheel 235 in response to particular aircraft operating conditions. For example, during engine operating condition where pressure at high pressure bleed 210 and low pressure bleed 22 is relatively high (e.g., during or in-response to a take-off condition, a climb conditions, and/or portions of engine cruise), turbine 230 may drive flywheel 235. In this regard, flywheel 235 may rotate, storing rotational energy. Generator 232 may be configured to load flywheel 235. Generator 232 may load flywheel 235 in response to an aircraft energy need and/or during engine operating condition where pressure at high pressure bleed 210 and low pressure bleed 22 is relatively low (e.g., during or in-response to portions of engine cruise and/or a descent condition). The stored rotational energy of flywheel 235 may drive generator 232 to create electricity that may be provided to the primary aircraft electrical system.

In various embodiments, ECS 200 may be configured to reduce the load on a gas turbine engine (e.g., an APU or main aircraft engine) associated with power generation. In this regard, the power produced by generator 232 in response to turbine 230 being driven by air from high pressure bleed port 210 and/or low pressure bleed port 220 may be supplied to the aircraft to power lighting, entertainment system, and/or the like.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An environmental control system of a gas turbine engine, the environmental control system comprising:
   a precooler;
   a duct extending between the precooler and at least one of a high pressure bleed and a low pressure bleed of the gas turbine engine;
   a turbine installed in the duct of the environmental control system, wherein the turbine is in fluid communication with the at least one of the high pressure bleed and the low pressure bleed of the gas turbine engine;
   a variable geometry disposed between an inlet of the turbine and the precooler;
   a generator coupled to the turbine and configured to produce power in response to rotation of the turbine; and
   a power distribution system in electronic communication with the generator and an aircraft electrical distribution system.

2. The turbine assembly of claim 1, wherein the turbine comprises a variable area exhaust, wherein the variable area exhaust is the variable geometry.

3. The turbine assembly of claim 1, wherein the turbine is configured to discharge air to the precooler via the variable geometry.

4. The turbine assembly of claim 1, wherein the variable geometry is a valve coupled downstream of the turbine.

5. The turbine assembly of claim 4, wherein the valve is coupled to an outlet of the turbine.

6. An environmental control system, comprising:
   a turbine comprising a variable area exhaust;
   a generator coupled to the turbine;
   a low pressure bleed port configured to provide low pressure bleed air to the turbine;
   a high pressure bleed port configured to provide high pressure bleed air to the turbine;
   a precooler; and
   a duct extending between the precooler and both of the high pressure bleed port and the low pressure bleed port;
   wherein the turbine is installed in the duct.

7. The environmental control system of claim 6, wherein the turbine is configured to reduce a pressure of air from at least one of the low pressure bleed port and the high pressure bleed port.

8. The environmental control system of claim 6, wherein the precooler is configured to receive output air flow from the variable area exhaust of the turbine.

9. The environmental control system of claim 8, wherein the generator is configured to generate power in response to the turbine receiving at least one of the high pressure bleed air and the low pressure bleed air.

10. The environmental control system of claim 6, further comprising at least one of a battery and a flywheel that are configured to store energy produced by at least one of the turbine and the generator.

11. The environmental control system of claim 6, further comprising a sensor configured to measure at least one of an airflow and a pressure.

12. An aircraft power distribution system, comprising:
a primary aircraft power distribution system comprising a primary generator; and
a secondary aircraft power distribution system comprising:
a turbine configured to receive airflow from one or more bleed ports of a gas turbine engine and to deliver air to an environmental control system, wherein a variable geometry is disposed between an inlet of the turbine and the environmental control system;
a secondary generator coupled to the turbine, the secondary generator configured to produce power that is supplied to the primary aircraft power distribution system through the second aircraft power distribution system.

13. The aircraft power distribution system of claim 12, wherein the turbine is configured to receive a pressurized airflow from at least one of a low pressure bleed port and a high pressure bleed port.

14. The aircraft power distribution system of claim 12, wherein the turbine is configured to reduce the pressure of air received from at least one of a low pressure bleed port and a high pressure bleed port, and is configured to supply air to a precooler.

15. The aircraft power distribution system of claim 12, wherein the turbine comprises a variable area exhaust, wherein the variable area exhaust is the variable geometry.

* * * * *